United States Patent Office 2,833,767
Patented May 6, 1958

2,833,767
NEW PYRIMIDINE COMPOUNDS

Robert Michel Jacob, Ablon-sur-Seine, France, assignor to Societe des Usines Chimiques Rhone-Poulenc, Paris, France, a French body corporate No Drawing. Application October 28, 1952
Serial No. 317,369

Claims priority, application France November 6, 1951

4 Claims. (Cl. 260—256.4)

This invention relates to new organic compounds having valuable chemotherapeutic properties, and having particularly valuable anti-malarial properties.

The new compounds of the present invention are the 2:4 - diamino-5-(4′-chlorophenyl)-6-ethylpyrimidine derivatives in which one hydrogen atom of the 4-amino group has been replaced by a radical selected from the group consisting of saturated and unsaturated aliphatic radicals containing from 1 to 6 carbon atoms, cycloalkyl radicals and aralkyl radicals, and the salts of such derivatives. The bases in question possess the general formula:

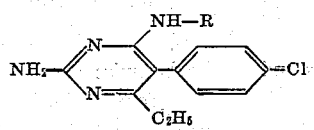

where R is a radical selected from the group consisting of saturated and unsaturated aliphatic radicals containing from 1 to 6 carbon atoms, cycloalkyl radicals and aralkyl radicals.

Compounds of the foregoing formula and their salts may be obtained, in accordance with a feature of this invention, by a process which comprises reacting 2-amino-4-chloro-5-(4′-chlorophenyl)-6- ethylpyrimidine, or its 2-acetylamino derivative, with an amine having the general formula R—NH$_2$, where R has the significance hereinbefore given. Where the 2-acetylamino derivative is employed, deacetylation takes place simultaneously.

In carrying out either of these processes, it is preferred to heat the reactants at a temperature in excess of 100° C., and preferably between 150° C. and 200° C., using preferably an excess of the amine R—NH$_2$. When using a lower aliphatic amine as one of the reactants, the reaction is carried out under superatmospheric pressure (in an autoclave), but in the case of amine reactants of sufficiently high boiling point, the reactants may be heated under reflux at normal pressure. The presence of an inert solvent such as ethanol to facilitate the reaction is optional.

Compounds of the foregoing formula and their salts may also be obtained, in accordance with a particularly advantageous feature of this invention, by a process which comprises reacting 2-amino-4-chloro-5-(4′-chlorophenyl)-6-ethylpyrimidine or its 2-acetylamino derivatives with a salt of an amine, said amine having the general formula R—NH$_2$, where R has the significance hereinbefore given. Suitable amine salts include the hydrochlorides and the acetates. The reaction proceeds in a satisfactory manner in the absence of a solvent at a temperature in excess of 150° C., and preferably at a temperature around 200° C. This method of operation, using an amine salt as one of the reactants, is of particular advantage in that the use of an autoclave for effecting the reaction is in all cases unnecessary, even when using (in the form of a salt thereof) a lower aliphatic amine as one of the reactants. Following the reaction, the free base may be recovered from the reaction mixture after washing this with an aqueous medium rendered alkaline with ammonia.

2-amino-4-chloro-5-(4′chlorophenyl)-6-ethylpyrimidine and its N-acetylated derivative, which serve as starting materials for the production of the new compounds of the present invention, may be produced as described in our co-pending application Serial No. 294,485, filed June 19, 1952.

The new bases of the present invention may readily be converted to salts by the normal methods known for converting organic bases into their salts. Both the bases and their salts with acids normally giving non-toxic salts have interesting anti-parasitic properties, in particular pronounced anti-malarial activity, which renders them suitable for use in human and veterinary medicine.

In the following examples which serve to illustrate the invention, the melting points indicated were determined on the Kofler block.

Example I

A mixture of 5 g. of 2-amino-4-chloro-5-(4′-chlorophenyl)-6-ethylpyrimidine, 10 cc. of methylamine and 10 cc. of ethanol is heated in an autoclave for 7½ hours at 160°–165° C. The reaction mixture is taken up in 100 cc. of water, filtered, washed with water and dried in vacuo. In this way, there are obtained 4.1 g. of 2-amino-4-methylamino-5-(4′ - chlorophenyl)-6-ethylpyrimidine, which product melts at 212–213° C. and the hydrochloride of which crystallises with one molecule of water and has a first melting point of about 160° C. and a second of 245°–250° C.

Example II

A mixture of 15 g. of 2-acetylamino-4-chloro-5-(4′-chlorophenyl)-6-ethylpyrimidine, 20 cc. of methylamine and 10 cc. of ethanol is heated in an autoclave for 8 hours at 160° C. The reaction mixture is taken up in 200 cc. of water, and the product formed is filtered, washed with water and dried in vacuo. 9.7 g. of a product as described in Example 1 are thus obtained.

Example III

Proceeding as in Example I, but using 10 cc. of monoethylamine instead of 10 cc. of monomethylamine, there are obtained 3.5 g. of 2-amino-4-ethylamino-5-(4′-chlorophenyl)-6-ethylpyrimidine, which product melts at 182°–183° C. and the hydrochloride of which crystallises with one molecule of water and has a first melting point of about 150° C. and a second of 232° C.

Example IV

Proceeding as in Example II, but using 20 cc. of ethylamine instead of 20 cc. of methylamine, 11.4 g. of a product as described in Example III are obtained.

Example V

Proceeding as in Example II, starting with 10 g. of 2-acetylamino - 4 - chloro - 5 - (4′ - chlorophenyl) - 6-ethylpyrimidine, 15 g. of 4-n-propylamine and 10 cc. of ethanol, there are obtained 9 g. of 2 - amino - 4 - n - propylamino - 5 - (4′ - chlorophenyl) - 6-ethylpyrimidine, this product melting at 138°–140° C., re-soldifying and melting at 154°–155° C. After crystallisation from ethanol, the respective melting points are 140° and 157° C.

Example VI

Proceeding as in Example II, but starting with 10 g. of 2 - acetylamino - 4 - chloro - 5 - (4′ - chlorophenyl) - 6-ethylpyrimidine, 20 cc. of isopropylamine and 10 cc. of ethanol, 8.2 g. of 2 - amino - 4 - isopropylamino - 5 - (4′-chlorophenyl)-6-ethylpyrimidine are obtained, this product melting at 210° C. Its hydrochloride, which crystallises with one molecule of water, has a first melting point of 150° C. and a second of 210° C.

Example VII

Proceeding as in Example II, starting with 10 g. of 2-acetylamino - 4 - chloro - 5 - (4' - chlorophenyl) - 6-ethylpyrimidine, 15 g. of n-butylamine and 10 cc. of ethanol, there are obtained 7.9 g. of 2-amino-4-butylamino-5-(4'-chlorophenyl)-6-ethylpyrimidine which product melts at 133° C. Its hydrochloride melts at 200°–205° C.

In a similar manner, the following products may be prepared:

2 - amino - 4 - n - pentylamino - 5 - (4' - chlorophenyl)-6-ethylpyrimidine of M. P. 114–115° C.

2 - amino - 4 - n - hexylamino - 5 - (4'-chlorophenyl)-6 - ethylpyrimidine of M. P. 109–110° C. and then 118° C.

2 - amino - 4(2' - butylamino) - 5-(4''-chlorophenyl)-6-ethylpyrimidine of M. P. 166° C.

2 - amino - 4(3' - pentylamino) - 5 - (4'' - chlorophenyl)-6-ethylpyrimidine of M. P. 164° C.

2 - amino - 4(3' - methyl-butylamino) - 5 - (4'' - chlorophenyl)-6-ethylpyrimidine of M. P. 143° C.

Example VIII

Proceeding as in Example II, starting with 10 g. of 2-acetylamino - 4 - chloro - 5 - (4' - chlorophenyl) - 6-ethylpyrimidine, 15 g. of cyclohexylamine and 10 cc. of ethanol, 9.9 g. of 2 - amino - 4 - cyclohexylamino - 5 - (4'-chlorophenyl)-6-ethylpyrimidine melting at 202° C. are obtained. Its hydrochloride melts at 240° C.

Example IX

Proceeding as in Example II, but starting with 10 g. of 2 - acetylamino - 4 - chloro - 5 - (4'-chlorophenyl) - 6-ethylpyrimidine, 15 g. of allylamine and 10 cc. of ethanol, 8.6 g. of 2 - amino - 4 - allylamino - 5 - (4'-chlorophenyl)-6-ethylpyrimidine, which melts at 145° C., are obtained. After recrystallisation from ehanol, the product melts at 150°–151° C.

Example X

A mixture of 10 g. of 2-acetylamino-4-chloro-5-(4'-chlorophenyl)-6-ethylpyrimidine and 20 g. of benzylamine is heated under reflux for 2 hours. The reaction mass is taken up in 200 cc. of water, filtered, washed with water and dried in vacuo over sulphuric acid. 11.4 g. of 2-amino - 4 - benzylamino - 5 - (4'-chlorophenyl) - 6-ethylpyrimidine, which melts at about 140° C. (somewhat indefinite), are thus obtained.

Example XI

A mixture of 2 g. of 2-amino-4-chloro-5-(4'-chlorophenyl)-6-ethylpyrimidine of M. P. 163° C. and 1.1 g. of isopropylamine hydrochloride is heated for 2 hours at 200° C. The reaction mass is taken up in water, rendered alkaline with ammonia, filtered, washed with water and dried in vacuo. 2 g. of crude 2-amino-4-isopropylamino-5-(4'-chlorophenyl)-6-ethylpyrimidine having a M. P. of 200° C. are thus obtained. After recrystallisation from alcohol the product is pure and melts at 210° C.

In a similar maner there was obtained the product of Example VII, melting at 132–133° C.

I claim:

1. Pyrimidine derivatives having valuable chemotherapeutic properties, and having particularly valuable antimalarial properties, selected from the class consisting of bases of the general formula:

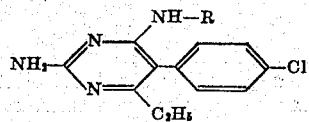

and the non-toxic acid salts of such bases, where R is selected from the class consisting of

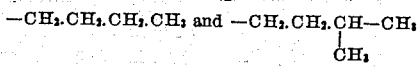

2. A compound of the formula:

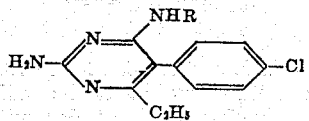

in which R is a lower alkyl radical.

3. 2 - amino - 4 - methylamino - 5 - p - chlorophneyl-6-ethylpyrimidine.

4. 2 - amino - 4 - butylamino - 5 - (4' - chlorophenyl)-6-ethylpyrimidine.

References Cited in the file of this patent

UNITED STATES PATENTS

| | | |
|---|---|---|
| 2,455,396 | Adams et al. | Dec. 7, 1948 |
| 2,576,939 | Hitchings et al. | Dec. 4, 1951 |
| 2,628,236 | Hitchings et al. | Feb. 10, 1953 |